United States Patent [19]
Arnoldt

[11] Patent Number: 5,015,018
[45] Date of Patent: * May 14, 1991

[54] DUCT CONNECTOR

[75] Inventor: Peter J. Arnoldt, Clairton, Pa.

[73] Assignee: Ductmate Industries, Inc., Monongahela, Pa.

[*] Notice: The portion of the term of this patent subsequent to Sep. 19, 2006 has been disclaimed.

[21] Appl. No.: 387,338

[22] Filed: Jul. 28, 1989

Related U.S. Application Data

[63] Continuation-in-part of Ser. No. 218,807, Jul. 13, 1988, Pat. No. 4,867,490, which is a continuation-in-part of Ser. No. 205,305, Jun. 10, 1988, Pat. No. 4,881,762.

[51] Int. Cl.$^5$ ............................................. F16L 23/00
[52] U.S. Cl. ..................................... 285/367; 285/424
[58] Field of Search ................ 285/367, 331, 410, 424

[56] References Cited

U.S. PATENT DOCUMENTS

| | | | |
|---|---|---|---|
| 2,747,897 | 5/1956 | Leighton | 285/410 |
| 2,761,707 | 9/1956 | Herman | 285/367 |
| 2,804,559 | 8/1957 | Brewer | 285/410 X |
| 2,862,731 | 12/1958 | Hedden et al. | 285/367 X |
| 2,880,017 | 3/1959 | Anderson et al. | 285/424 X |
| 3,415,543 | 12/1968 | Keating | 285/424 X |
| 3,630,552 | 12/1971 | Byron | 285/367 X |
| 4,120,519 | 10/1978 | Bridges | 285/410 X |
| 4,516,797 | 5/1985 | Meinig | 285/424 X |
| 4,537,430 | 8/1985 | Sullivan | 285/424 X |
| 4,566,724 | 1/1986 | Arnoldt et al. | 285/424 X |
| 4,679,832 | 7/1987 | Meinig | 285/424 X |
| 4,867,490 | 9/1989 | Arnoldt | 285/367 |
| 4,881,762 | 11/1989 | Arnoldt | 285/367 |

Primary Examiner—Dennis L. Taylor
Assistant Examiner—J. Russell McBee
Attorney, Agent, or Firm—Stanley J. Price, Jr.

[57] ABSTRACT

A pair of frame members are secured to the ends of a pair of ducts having a generally circular or arcuate configuration. Each frame member has the same generally circular or arcuate configuration and has an inner vertical wall and an outer vertical wall. The outer vertical wall is connected to a sloped rigidifying portion which extends outwardly from the inner vertical wall. Both the inner and outer vertical walls have horizontally extending flanges which are in abutting relation and their end portions are clampingly engaged. The frame members have a circumferential or peripheral dimension less than the circumferential or peripheral dimension of the duct member so that at least one gap is formed in the circular or arcuately shaped frame member. The frame members are positioned on the duct end portions by inserting the frame member flange portion inside the duct end portions with the top surface of the frame member upper flange abutting the underside of the duct. Fasteners secured to the duct end portion of the flange members are applied to the flange member and duct end portion to urge the frame member flange portion against the undersurface of the circular duct.

18 Claims, 2 Drawing Sheets

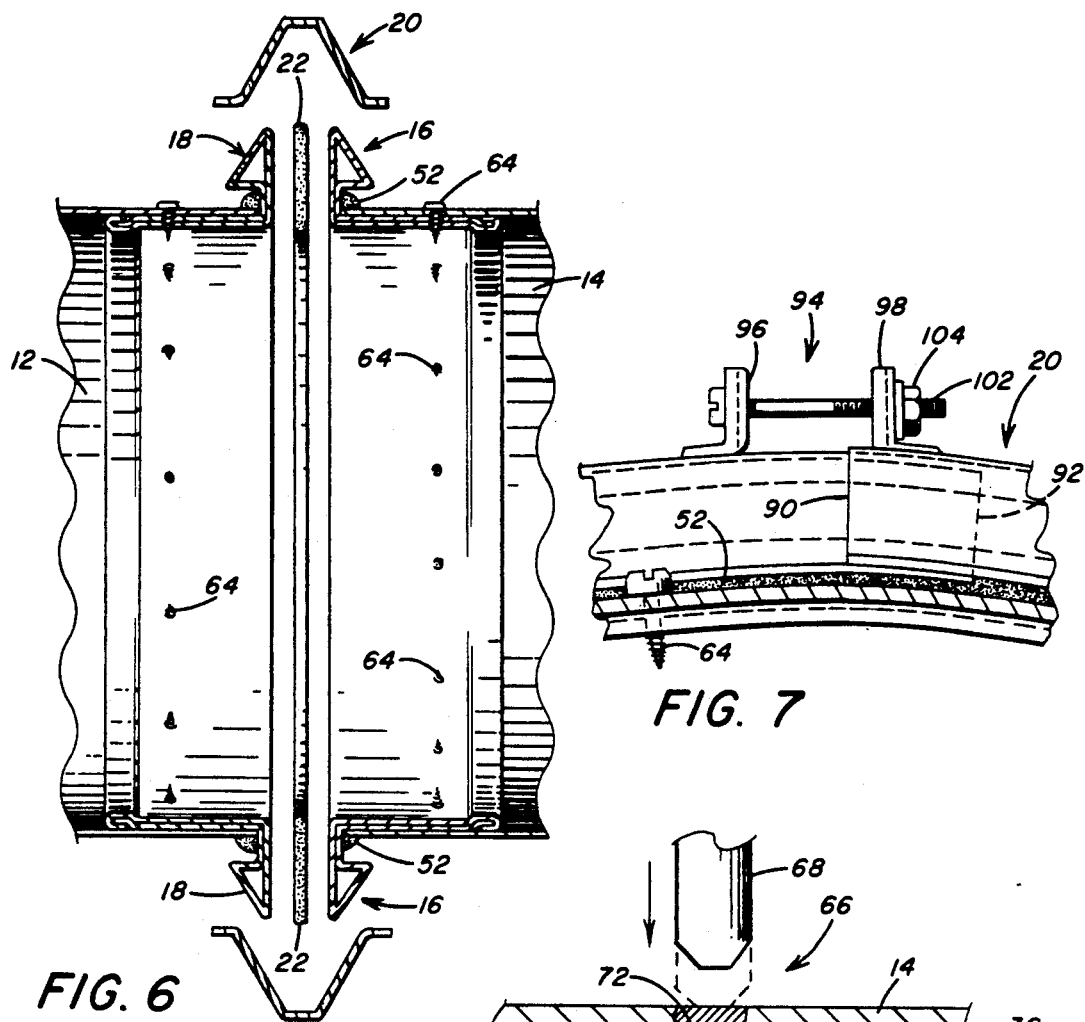
FIG. 6
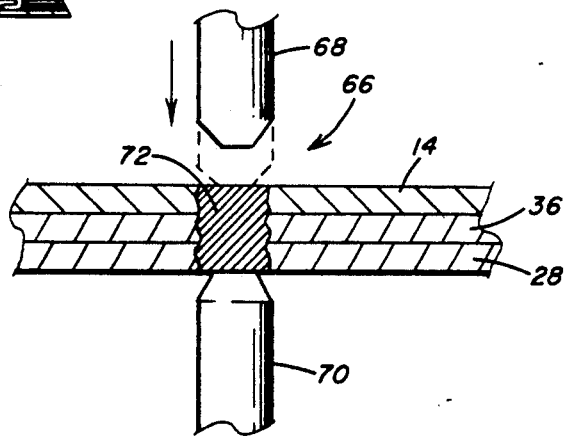
FIG. 7
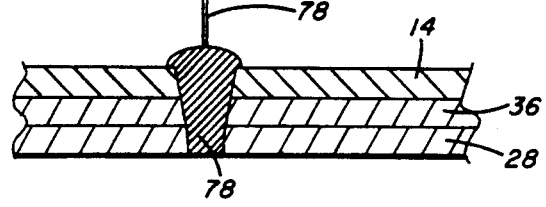
FIG. 8
FIG. 9

DUCT CONNECTOR

CROSS-REFERENCE TO RELATED APPLICATIONS

This application is a continuation-in-part of U.S. application Ser. No. 218,807 entitled "Circular Duct Connector" filed July 13, 1988, now U.S. Pat. No. 4,867,490 which in turn is a continuation-in-part of U.S. application Ser. No. 205,305 entitled "Duct Connector For A Circular Duct" filed June 10, 1988 now U.S. Pat. No. 4,881,762.

BACKGROUND OF THE INVENTION

1. Field of the Invention

This invention relates to a method and apparatus for connecting the ends of a pair of duct sections, and more particularly to a duct joint frame assembly for connecting the ends of circular ducts or ducts that have an arcuate configuration that includes a pair of arcuate frame members each secured to an end portion of the circular or arcuate duct and positioned to provide an airtight seal between the ends of the circular duct as the frame members are urged together and into contact with a gasket positioned between the frame members.

2. Description of the Prior Art

It is well known to connect the ends of adjacent rectangular heating and air-conditioning ducts by a joint assembly secured to the ends of the adjacent duct members.

U.S. Pat. No. 3,415,543 discloses a hollow coupling frame for connecting a pair of rectangular duct sections. The frame includes a pair of reversely folded legs on one side thereof which define oppositely disposed channels for receipt of the sections to be joined. The legs end in angularly related laterally disposed locking lips, which extend back toward the legs to engage and lock the sections within the channels.

U.S. Pat. No. 3,630,549 discloses a duct joint connector for rectangular ducts which includes a rectangular inner frame positioned between adjacent rectangular ducts so that the duct ends abut the frame. The rectangular ducts are secured to the frame by means of external cleats. The corners of the rectangular frame are enclosed by end caps, and mastic may be pumped into the frame to seal air gaps between the ducts and the frame.

U.S. Pat. No. 4,046,409 discloses an arrangement for joining rectangular ventilation ducts. A first and second member are connected with a first duct end and a second duct end, respectively. The second member is provided with an upright stiffening leg and a horizontal leg terminated by a hook-shaped member, which can be snapped over a raised edge of the first member. The first member comprises a horizontal lip which is received by the second member.

U.S. Pat. No. 4,410,206 discloses a flange connection for rectangular air-conditioning ducts. The flange connection includes eight pieces of open-sided box girder, four of which are slipped onto and fixed to each of two rectangular ducts to form frames thereon. The two frames are then bolted together. Angle pieces are inserted into the frames at the corners and bolted to the frames to produce the desired sealing force between the frames.

U.S. Pat. No. 4,508,376 discloses a flange type duct joint assembly that includes a pair of frame members secured to the ends of adjacent rectangular ducts. The frame members have flange portions secured to each other by angular corner pieces having rearwardly curved or displaced flange portions operable to facilitate an airtight seal between the ends of the duct sections and the frame members.

U.S. Pat. No. 4,509,778 discloses a duct joint assembly for sealingly connecting the ends of a pair of rectangular sheet metal duct sections that includes clamps for both connecting adjacent corner pieces which are part of the joint assembly and exerting sealing forces upon the corner pieces.

Assemblies for use in connecting the ends of rectangular ducts are also disclosed in the U.S. Pat. Nos. 4,542,923 and 4,558,892. The duct assemblies disclosed in these patents each include a plurality of individual frame members secured to the ends of adjacent rectangular ducts. Angular corner pieces are inserted into the ends of adjacent frame members, and the adjacent frame members on opposing duct ends are secured together by means of a clamp.

U.S. Pat. No. 4,566,724 discloses a duct joint frame for connecting rectangular duct sections that includes a plurality of flange members positioned oppositely of one another on the ends of the pair of generally rectangular ducts. Each flange member includes a stop arranged to engage a plurality of protuberances on the inner surface of the duct adjacent the duct end portion to prevent retraction of the duct end portion from the flange member. Angular corner pieces extend into the ends of the flange members to connect adjacent flange members and form a frame around the respective duct end portions.

Assemblies for connecting the ends of rectangular duct sections are also disclosed in West German Patent Nos. 2,434,160 and 2,758,295. The assemblies disclosed in these patents each include a plurality of frame members which are slipped onto the ends of the opposing duct sections, and corner pieces which are inserted into the adjacent frame members on each duct. The corner pieces are bolted together to connect the adjacent duct sections.

Although the above listed patents each disclose apparatus for connecting generally rectangular duct sections, it is also known to provide apparatus for connecting the ends of generally circular duct sections.

U.S. Pat. No. 3,512,805 discloses a flexible strip for connecting the ends of generally circular ducts. The flexible strip includes a pair of longitudinal grooves adapted to receive the ends of the circular ducts therein. Protuberances on the outside surfaces of the circular ducts engage the longitudinal grooves to prevent retraction of the circular ducts from the strip after assembly.

U.S. Pat. No. 3,791,681 discloses a device for establishing a sealing connection between the ends of tubular members. The ends of the tubular members are bent outwardly, and a sealing member is positioned between the outwardly bent ends of the adjacent tubular members. A connecting strip having a substantially U-shaped cross section is forced over the outwardly bent ends of the tubular members to clamp the tubular member ends against the sealing member.

U.S. Pat. No. 4,418,948 discloses an elastic coupling for joining two pipes or tubes carrying a pressurized fluid. The coupling includes a plurality of elastic ring segments each having an annular cross section and a clamping collar. The pipes or tubes to be connected each include an outwardly extending rim or flange around the circumference of the edge of the pipe. The pipe flanges are arranged to receive the elastic ring segments. After the elastic ring segments are placed in surrounding relationship with the pipe flanges, the clamping collar is clamped down into contact with the ring segments causing the cross section of the ring segments to contract. As the ring segments contract, the pipe flanges are moved towards one another to compress a seal disposed intermediate the two flanges.

U.S. Pat. No. 4,516,797 discloses a flanged ring for connecting sheet metal tube sections. Each flanged ring includes a securing flange which protrudes radially outwardly from the tube section, an arm projecting from the inner end of the securing flange and a ring land bent obliquely outward from the arm toward the securing flange. The outer diameter of the ring land is selected such that when it is driven into the end of the tube, it is prestressed and thus produces a joint between the flanged ring and the tube. To connect a pair of sheet metal tube sections, a pair of flanged rings are secured to the ends of adjacent circular ducts, and the securing flanges of the adjacent flanged rings are fixed firmly to one another by means of a screw connection, clamp or the like. A German publication identified as "Metu System 61" illustrates a flange ring for connecting the ends of circular metal duct and is similar to the disclosure of U.S. Pat. No. 4,516,797. There is also a Canadian publication by Titan Steel Corporation which illustrates a similar product.

While it has been suggested by the prior art devices to connect a pair of adjacent rectangular duct sections or circular duct sections by means of a pair of frame members or the like, there is a need for an improved duct connector for connecting the ends of a pair of adjacent circular or arcuately shaped ducts in which the adjacent frame members are sealingly connected to the duct end portions and the vertical walls of adjacent frame members are urged together and into contact with a gasket member positioned between the adjacent frame members to provide an airtight seal between the connected duct sections.

SUMMARY OF THE INVENTION

In accordance with the present invention, there is provided a duct joint frame for connecting the end portions of a duct having a circular or generally arcuate configuration. The frame assembly includes a circular or arcuate frame member arranged to be secured to an end portion a circular or arcuate duct having substantially the same configuration as the frame member. The duct has an end portion with an inner surface and a circular or arcuate edge portion. The frame member has a circumferential dimension less than the circumferential dimension of the inner surface of the circular or arcuate duct end portion. The frame member includes a vertical wall and an angularly extending flange. The flange upper surface is arranged to be positioned in abutting relation with the inner surface of the circular or arcuate duct. A means is provided to form at least one gap in the frame member and expose a portion of the circular duct edge portion when the arcuate duct end portion is positioned on the arcuate frame member flange portion. The frame member has a surface arranged to sealingly receive a circular seal member. Means are provided to urge the frame assembly outwardly against the circular duct inner surface and secure the frame top and bottom flanges to the end portion of the arcuate duct.

The frame member may also include an inner vertical wall with a top edge portion and an angularly extending bottom flange. A rigidifying means extends from the inner vertical wall adjacent the top edge portion. The frame further includes an outer vertical wall extending downwardly from the rigidifying means and has an angularly extending top flange with an upper surface. The outer vertical wall angularly extending top flange is arranged to abut the inner vertical wall angularly extending bottom flange.

Further in accordance with the invention, there is provided a method for connecting a duct joint frame to the end portion of a generally circular or arcuate duct where the duct has a generally circular configuration, the method further includes positioning a generally circular frame member having a vertical wall portion and a horizontally extending flange portion on the end of a circular duct with the flange portion positioned within the circular duct. The generally circular frame member has a circumferential dimension less than the circumferential dimension of the duct member so that a gap is formed in the circular frame member. The frame member flange portion is secured to the duct end portion by rigid fastener means. The fastener means is first secured to the duct member and circular frame member at a location adjacent the gap in the frame member. Thereafter, the duct member is secured to the flange portion of the frame by sequentially securing fastener means at locations progressively spaced at greater distances from the gap to thereby urge the frame member flange portion against the inner surface of the circular duct.

The present invention further includes a method of connecting the end portions of a duct that has a generally arcuate configuration and includes positioning a pair of generally arcuate frame members that have a vertical wall portion and a horizontally extending flange portion on the edge of a pair of arcuate ducts with the flange portions positioned on a surface of the arcuate ducts. Each of the generally arcuate frame members have a peripheral dimension less than the peripheral dimension of the arcuate duct members so that at least one gap is formed in each of the arcuate frame members. The frame member flange portions are secured to the respective duct end portions with an edge portion of each of the duct end portions extending into the gap formed in the respective arcuate frame members. The arcuate frame members are so positioned that the vertical wall portions face each other. An arcuate gasket is positioned between the frame member vertical wall portions and across the gaps formed in each of the arcuate frame members. The frame members are connected to each other with a gasket therebetween so that the edge portions of the duct end portions in the gap portions of the frame members are sealed by the gasket member.

The invention also includes fabricating the frame members with a peripheral dimension less than the peripheral dimension of the duct on which it is positioned so that there are free end portions of the frame member that are positioned in spaced relation to each other. In the illustrated embodiment, the frame member is urged against the duct inner surface by the fastening means as the frame member is fastened to the duct.

Accordingly, the principal object of the present invention is to connect a pair of adjacent circular or arcuately shaped ducts by means of a circular or arcuately shaped duct frame assembly that includes a pair of frame members each secured to a pair of adjacent circular or arcuately shaped duct end portions. The duct joint frame assembly includes a gasket positioned between the adjacent circular or arcuate frame members and the pair of frame members are urged into contact with the gasket to provide a sealed connection between adjacent circular or arcuately shaped ducts.

Another object of this invention is to provide a circular or arcuately shaped frame member having a circumferential or peripheral dimension less than the circumferential or peripheral dimension of the duct on which the frame member is positioned so that the frame member is urged against the circular or arcuately shaped frame member to provide a sealed connection between the frame member and the end of the duct.

A further object of the present invention is to provide a method and apparatus for connecting a duct joint frame member to the end of a generally circular or arcuately shaped duct in which the duct joint frame member has at least one gap to permit the edge of the duct to be sealed by the gasket member.

These and other objects of the present invention will be completely disclosed and described in the following specification, the accompanying drawings and the appended claims.

BRIEF DESCRIPTION OF THE DRAWINGS

FIG. 6 is an enlarged, exploded view in section of a pair of frame members secured to adjacent circular ducts with the gasket positioned between adjacent frame members and the clamp ring surrounding the adjacent frame member.

FIG. 7 is a view in partial section taken along the line 7—7 in FIG. 1 illustrating the overlapped end portions of the clamp ring and the clamp ring tightening assembly.

FIG. 8 is a fragmentary view of a portion of FIG. 5 illustrating the frame member secured to the duct end portion by a spot weld.

FIG. 9 is similar to FIG. 8 illustrating the frame member secured to the duct end portion by a plug weld.

DESCRIPTION OF THE PREFERRED EMBODIMENTS

Figure 1:
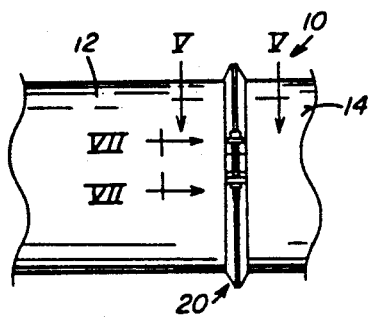
FIG. 1 is a fragmentary view in elevation of a pair of duct sections connected by a joint frame assembly.

Referring to the drawings and particularly FIGS. 1-4, there is illustrated a duct joint frame assembly generally designated by the numeral 10 for connecting the ends of circular ducts 12 and 14. The duct joint frame assembly 10 includes a pair of circular frame members generally designated by the numerals 16 and 18 and a circular clamp generally designated by the numeral 20. The end portions of the ducts 12 and 14 are secured to each other by a pair of frame members 16 and 18 connected to the respective duct end portions 12 and 14. The frame members 16 and 18 have a circular gasket 22 positioned therebetween and the circular clamp 20, as illustrated in FIG. 5, which clampingly secures the frame members 16 and 18 to each other which in turn sealingly connects the duct end portions 12 and 14 to each other.

The frame members 16 and 18 have substantially the same configuration and are rolled from a flat piece of thin gauge metal by a roll former. The frame members have a profile which is illustrated in section in FIGS. 5 and 6.

Figure 3:
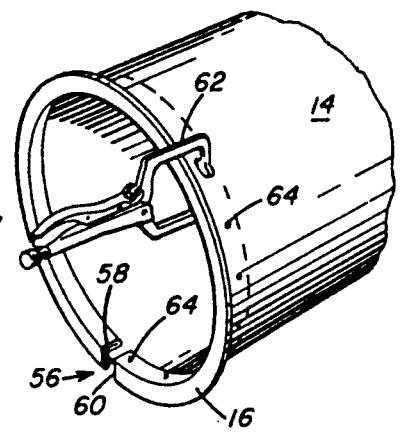
FIG. 3 is a view similar to FIG. 2 illustrating the frame during an intermediate stage of assembly.
Figure 2:
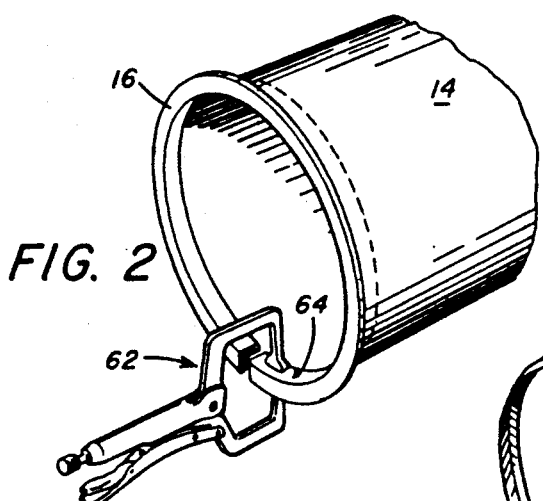
FIG. 2 is an isometric view of a frame member and a circular duct with the frame member positioned on the end of the duct and secured thereto by a suitable clamp during the initial stages of assembly.
Figure 4:
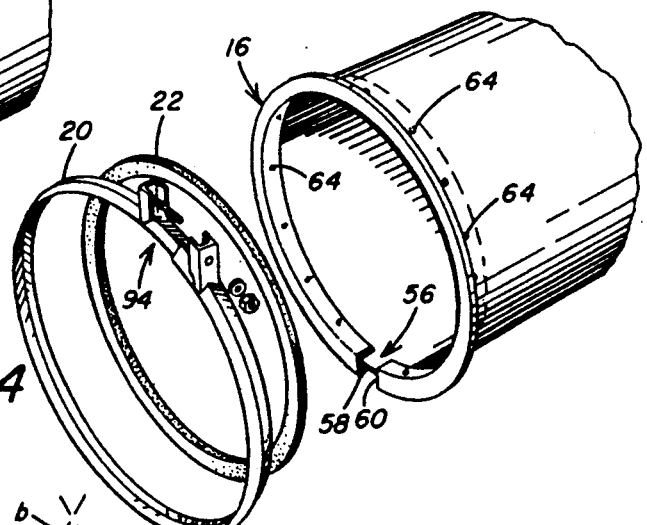
FIG. 4 is a fragmentary view in partial section illustrating the frame secured to the duct end portion, the sealing gasket and the overlapped end portions of the clamp ring and clamp ring tightening assembly illustrated in FIG. 1.
Figure 5:
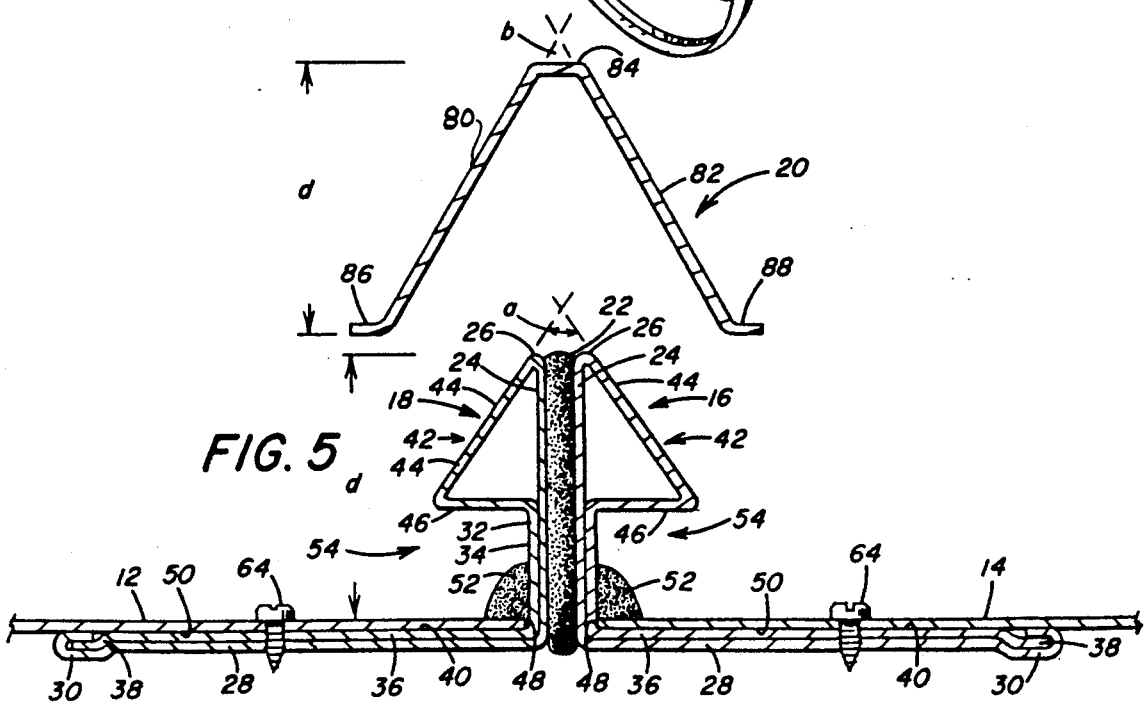
FIG. 5 is an enlarged view in section taken along the line V—V in FIG. 1 illustrating a pair of duct joint frames connected to the end portions of a pair of adjacent ducts and the circular clamp positioned above the pair of frame members.

FIG. 5 illustrates in section a pair of frame members 16 and 18 secured to a pair of adjacent circular ducts 12 and 14. FIGS. 2, 3 and 4 illustrate the manner that the frame members 16 and 18 are secured to the end portions of the circular ducts 12 and 14. FIGS. 2-4 illustrate the duct 14 with the frame member 16 being secured thereto invarious stages of assembly. FIG. 4 further illustrates the gasket member 22 and the circular clamp 20.

Referring to FIGS. 5 and 6, the frame members 16 and 18 are similar in construction and each has an inner vertical wall 24 and a top edge portion 26 and a horizontal flange portion 28. The flange portion 28 extends from the vertical wall 24 and will, for convenience, be referred to as a lower or bottom flange 28. The lower flange 28 terminates in a downturned rebent end portion 30 that is bent downwardly as illustrated in FIG. 5.

The frame members 16 and 18 each also have an outer vertical wall 32 with an outer surface 34 and a horizontally extending flange 36. The flange 36 extends angularly from the outer vertical wall 32 and has a downturned end portion 38 which extends into the downturned rebent portion 30 of the lower horizontal flange 28. For convenience, the flange 36 extending from the outer vertical wall 32 will be referred to as the upper or top flange 36. The horizontal lower flange 28 and the horizontal upper flange 36 are in abutting relation with each other and the end portion 38 of upper or top flange 36 is clampingly engaged in the downturned rebent portion 30 of the lower flange 28. The top or upper horizontal flange has a top surface 40 which is a substantially planar surface as viewed in section 2. The frame member 10 is circular in configuration and the surface 40 which appears planar in FIG. 5 is substantially flat and extends circumferentially beneath the respective duct end portions 12 and 14.

The frame members 16 and 18 have a rigidifying portion generally designated by the numeral 42 with an outwardly sloped or inclined leg 44 connected at one end to the inner vertical wall 24 at the top portion 26. The opposite end of the inclined portion 44 is connected to an inturned wall 46 which joins the outer vertical wall 32 at its upper edge portion. The rigidifying means 42 has a generally triangular configuration with the angularly extending leg 44 having a preselected slope.

The slope of legs 44 are projected in FIG. 5 by dash dot lines and in a compressed state form an included angle -a-.

The ducts 12 and 14 each have a front edge 48 and an undersurface 50. The undersurface 50 abuts the upper surface of flange 36. With this arrangement there is a substantial portion of the frame top flange surface 40 and the undersurface 50 of ducts 12 and 14 which are in abutting and sealing relation with each other. Further, as later discussed, the frame member horizontal flanges 28 and 36 are urged upwardly as viewed in FIG. 5 and outwardly against the undersurface of the ducts 12 and 14 adjacent their edge portion 48. A mastic 52 is positioned in a pocket generally designated by the numeral 54. The dimension of pocket 54 is such that it is arranged to receive a portion of the spiral overlap present in a spirally wound circular duct. The mastic 52 provides a seal between the duct edge 48 and the outer surface 34 of outer wall 32 and the undersurface of the ducts 12 and 14 adjacent the end portions 48 and the upper surface 40 of flange 36. The mastic 52 thus provides an external seal for the edge portions 48 of ducts 12 and 14.

Referring to FIGS. 2, 3 and 4, the duct frame 16 is shown in various stages of assembly onto the end of the duct 14. The frame 16 has a circumferential dimension that is less than the circumferential dimension of the duct 14 so that when the frame member 16 is rigidly secured to the end portion of the duct 14, the gap with free end portions 58 and 60, generally designated by the numeral 56, is present between the free end portions 58 and 60 of the frame member.

The purpose of the gap 56 is to permit the frame members 16 and 18 to be sealingly urged and against the duct inner surface 50 and thus rigidly secure the frame member to the duct end portions. The gap arrangement further permits the circumference of the frame to increase during the attachment to the duct and thus assure an abutting relation between the duct undersurface 50 to the upper surface 40 of the respective upper frame member 36.

In referring to FIGS. 2-4, the frame member 16 is secured to the end portion of duct 14 by positioning the flange member 16 within the duct 14 as illustrated in FIGS. 2 and 5. It should be noted because of the circumferential dimension of the frame 16 relative to the inner diameter of the duct 14, the gap 56 is present with the flange edge portions 58 and 60 spaced from each other. Before the flange 16 is secured to the duct 14, the dimension of the gap is relatively small as compared with its dimension after complete assembly.

After the flange 16 is positioned within duct 14 with the edge 48 extending into the mastic and abutting the other surface 34, a vise clamp 62 or other suitable clamping device, such as a C clamp, urge the flange portions 28 and 36 upwardly against the inner surface 50 of the duct 14. While the frame is being urged against inner surface of the duct 14, a securing means, such as a metal screw 64, is threadedly connected to the duct 14 and the flanges 36 and 28 to pull the flanges 36 and 28 toward and against the lower or undersurface 50 of the duct 14. Where desired, the mastic 52 may be applied after the frame is secured to the duct.

As illustrated in FIG. 8, the flanges 36 and 28 are secured to the lower surface 50 of the duct 14 by a spot weld generally designated by the numeral 66. With this type of weld, the electrodes 68 and 70 melt and fuse the metal of the flanges 36 and 28 and the duct 14 in the area 72.

FIG. 9 illustrates the manner in which the flanges 36 and 28 are secured to the duct 14 by a plug weld generally designated by the numeral 74 when the electrode 76 melts a hole in the metal of the flanges 36 and 28 and the duct 14 and a wire like welding metal 78 is fed into the hole and melted to provide a foreign weld material to weld the flanges 36 and 28 to the duct 14.

It should be understood that the other types of fastening means such as a bolt and nut or other known fastening means could be used in place of the above described fastening means. Throughout the remainder of the specification and drawings, the metal screw 64, for convenience, will be illustrated and referred to as the fastening means.

After the first metal screw 64 is inserted in the duct end portion 14 and the flanges 36 and 28, the vise grip 62 is removed and is moved along the frame away from the gap to a second location where it clamps the frame to the duct 14 and a second metal screw secures the frame 14 to the upper and lower flanges 36 and 28 in spaced relation to the first screw. This is repeated around the duct as illustrated in FIG. 3 so that the free non-connected end of the frame 16 is urged against the inner surface 50 of duct 14 until the screws 64 are secured around the entire periphery of the frame. With this arrangement, the frame is urged against the undersurface 50 of the duct 14 throughout the periphery of the circular frame 14. The gap 56 between the frame edge portions 58 and 60 increases in length as the sequential securing of the frame to the duct 14 progress. In FIG. 3, the dimension of the gap has increased when compared with FIG. 2 and FIG. 4 where the frame is secured around the entire periphery, the dimension of the gap 56 has increased relative to the gap illustrated in FIG. 3.

In order to sealingly connect the adjacent frame members to each other, a clamp such as the clamp 20 illustrated in FIGS. 4, 5 and 6 is utilized. The clamp 20 has a generally circular configuration and is preferably fabricated from a thin walled metallic material. The clamp includes a first leg 80 and a second leg 82 with a generally horizontal upper portion 84 and a pair of flanges 86 and 88. The legs 80 and 82 are angularly positioned relative to each other and have an included angle -b-.

The height of the clamp 20 from the underside of the upper portion 84 to the underside of the flange 88 designated by the letter -d- is preferably the same dimension as the distance from the top 26 of the frame members to the upper surface of the duct as illustrated in FIG. 5. It should be understood, however, that the dimension -d- can be less than the distance between the top 26 of the frame members to the upper surface of the duct.

The clamp 20 is split to permit it to be positioned around the pair of adjacent frame members and has edge portions 90 and 92. The circumferential dimension of the clamping member 20 is such that the end portions 90 and 92 overlap to facilitate the tightening of the clamp member 20 by the clamp ring tightening assembly generally designated by the numeral 94.

The clamp ring tightening assembly 94 includes a pair of generally L-shaped brackets 96 and 98 with bracket 96 secured to one end of the clamp and the other bracket 98 secured to the other end of the clamp 20. The brackets have openings through the upstanding leg portions for receiving a bolt 100 which has a threaded end portion 102. A nut 104 is threadedly secured to the bolt 100 and tightening of the nut 104 reduces the circumference of the clamp 20 to force the clamp 20 downwardly on the sloped portions 44 of the frame members 16 and 18.

As previously described, the clamp 20 has an included angle -b- between the legs 80 and 82. The pair of frame members 16 and 18 have sloped walls 44 which are angularly spaced from the vertical walls 24 by an included angle -a-. The included angle -a- for the frames 16 and 18 is greater than the angle -b- for the legs 80 and 82 of the clamp member 20. Conversely, the included angle b of clamp 20 is less than the included angle a of frame members 16 and 18. As the clamp 20 is tightened around the frame members 16 and 18, the legs 80 and 82 and the clamp 20 abut portions of the sloped walls 44 of frame members 16 and 18 to thus urge the frame members 16 and 18 toward each other to compress the gasket 22 therebetween. This clamping causes a pinching effect which results in the adjacent frame members 16 and 18 being urged toward each other so that the walls 24 of the respective frame members compress the gasket 22 in the area adjacent the vertical walls 24. It is this compressing action that seals the adjacent frame members 16 and 18 in gasket 22 to prevent air from escaping between the adjacent frame member vertical walls 24.

When the walls of the frame members 16 and 18 are urged toward each other to compress the gasket 22 therebetween, the portion of the gasket 22 in the frame gap 56 is not compressed and extends beyond the vertical walls of the frame member into abutting relationship with the edge of the conduit to the extent that the conduit edge 48 is embedded in the gasket material.

The duct end portions 12 and 14 are sealingly connected to each other by first positioning the frame members 16 and 18 on the duct end portions and embedding the duct end portions 48 in the mastic material 52. Since the frame member 16 or 18 has a circumferential dimension less than the circumferential dimension of the circular duct, the gap 56 is present when the frame is positioned on the duct end portion. As previously stated, it is preferred that the fastening means 64, such as screws, spot welds, plug welds or other suitable fastening means, first secure the edge of the duct to the flanges of the frame members adjacent one free edge of the frame member such as edge 56.

With this arrangement, the continued fastening of the frame member to the duct end portion by the fastening means 64 urges the frame member flanges toward the undersurface of the duct 14 with the upper surface 40 of flange 36 urged against the undersurface 50 of duct 14 so that the frame member closely conforms to the configuration of the duct member with the undersurface 50 of the duct in close abutting relation with the surface 40 of the top flange 36. The gap 56 provides a means whereby the gap can be increased in securing the flange to the duct end portion. The circumferential dimension of the flanges is preferred to be such that a gap 56 remains after the flange is secured to the duct end portion.

It should be noted that a rigid connection is provided for the flange members to the duct end portion by the fastening means such as screws 64 in that the fastening means extends through the duct wall and through a pair of flanges 28 and 36 which extend from each duct flange 16. The rebent portion 30 of the flange 28 by clamping the portion 38 of flange 36 therein, further rigidifies the portion of the duct joint frame that is secured to the duct end portion. The downturned portion 38 of flange 36 and the rebent portion 30 of flange 28 provides an axially planar surface 40 on the upper surface of upper flange 36 for the axially planar undersurface 50 of the ducts 12 and 14. Also, the sloped portions 44 of the duct joint frame further rigidify the circular frame member and also provide a means for ensuring a tightly clamped relation between the frame members by the clamp 20.

Although the preferred embodiment illustrates a circular duct and circular duct frames, it should be understood that both the duct and duct frame may have other types of arcuate configurations so that at least one gap is provided in the frame member for the edge portion of the duct to project into the gasket member positioned on the vertical face of the frame.

According to the provisions of the Patent Statutes, I have explained the principle, preferred construction and mode of operation of my invention and have illustrated and described what I now consider to represent its best embodiment. However, it should be understood, within the scope of the appended claims, the invention may be practiced otherwise than as specifically illustrated and described therein.

I claim:

1. A duct joint frame for connecting the end portions of a generally circular duct comprising, a circular frame member arranged to be secured to an end portion of a circular duct, said circular duct having an end portion with an inner surface and a circular edge portion, said circular frame member having free end portions and a circumferential dimension less than the circumferential dimension of the inner surface of said circular duct end portion, said frame member including;

an inner vertical wall with a top edge portion and an angularly extending bottom flange, a rigidifying means extending from said inner vertical wall adjacent said top edge portion, an outer vertical wall extending downwardly from said rigidifying means and having an angularly extending top flange with an upper surface, said outer vertical wall angularly extending top flange abutting said inner vertical wall angularly extending bottom flange, said top flange upper surface arranged to be positioned in abutting relation with the inner surface of said circular duct end portion, means to form a gap in said frame member between said free end portions and expose a portion of said circular duct edge portion when said circular duct end portion is positioned on said circular frame member, said frame member having a surface arranged to receive a circular seal member, and means to urge said frame member outwardly against said circular duct inner surface and secure said frame top and bottom flanges to the end portion of said circular duct.

2. A duct joint frame as set forth in claim 1 in which, said top flange includes a generally arcuate and axially planar upper surface engaging a mating generally arcuate and axially planar undersurface of a circular duct end portion.

3. A duct joint frame as set forth in claim 2 in which, said top flange includes a downturned end portion, said bottom flange includes a rebent end portion, said top flange having a generally arcuate and axially planar upper surface with said downturned end portion extending into said bottom flange rebent portion, said top flange rebent portion securing said top flange end portion with said top flange arcuate and axially planar upper surface engaging a mating generally arcuate and axially planar undersurface of a circular duct end portion.

4. A duct joint frame as set forth in claim 1 in which, said frame member inner vertical wall abuts said frame member outer vertical wall.

5. A duct joint frame as set forth in claim 1 in which, said rigidifying means includes a wall extending downwardly and sloping outwardly from said inner wall top edge portion and an inwardly extending flange connecting said sloping wall to said outer wall, said rigidifying means downwardly and outwardly extending wall extends at a preselected angle from said inner wall top edge and forms a triangular configuration with said inner vertical wall.

6. A duct joint frame as set forth in claim 1 in which, said means to urge said frame member outwardly against said circular duct inner surface and secure said frame to an end portion of said duct includes a plurality of spaced fastening means extending circumferentially around said frame.

7. A duct joint frame as set forth in claim 6 in which said fastening means includes a plurality of screws extending through and threadedly securing said frame flanges to said duct portion.

8. A duct joint frame as set forth in claim 6 in which said fastening means includes a plurality of plug welds extending through said circular duct end portion and securing said frame flanges to said duct end portion.

9. A duct joint frame as set forth in claim 6 in which said fastening means includes a plurality of spot welds metallically fusing said frame flanges to said duct end portion.

10. A duct joint frame as set forth in claim 1 in which said means to urge said frame members upwardly against said circular duct inner surface and secure said frame top and bottom flanges to said circular duct end portion are further arranged to urge said circular duct frame end portions away from each other to thus sealingly urge said frame flange top surface against said duct inner surface.

11. A method for connecting a duct joint frame to the end portion of a generally circular duct comprising, positioning a generally circular frame member having a vertical wall portion and a horizontally extending flange portion on the end of a circular duct with the flange portion positioned within the circular duct, said generally circular frame member having free end portions and a circumferential dimension less than the circumferential dimension of said duct member so that a gap is formed in said circular frame member, between said free end portions, securing said frame member flange portion to said duct end portion by rigid fastener means, said fastener means first secured to said duct member and circular frame member at a location adjacent the gap in said frame member, and thereafter sequentially securing the duct member to the frame member flange portion by fastener means at locations progressively spaced at greater distances from said gap to thereby urge said frame member flange portion against the inner surface of said circular duct.

12. A method for connecting a duct joint frame to the end portion of a generally circular duct as set forth in claim 11 which includes, securing said flange member flange portion to said duct end portion by rigid fastener means comprising a plurality of screws arranged circumferentially around said frame.

13. A method for connecting a duct joint frame to the end portion of a generally circular duct as set forth in claim 11 which includes, securing said flange member flange portion to said duct end portion by rigid fastener means comprising a plurality of plug welds arranged circumferentially around said frame.

14. A method for connecting a duct joint frame to the end portion of a generally circular duct as set forth in claim 11 which includes, securing said flange member flange portion to said duct end portion by rigid fastener means comprising a plurality of spot welds arranged circumferentially around said frame.

15. A duct joint frame for connecting the end portions of a duct having a generally arcuate configuration comprising, an arcuate frame member arranged to be secured to an end portion of an arcuate duct having substantially the same configuration as said arcuate frame member, said arcuate duct having an end portion with an inner surface and an arcuate edge portion, said arcuate frame member having free end portions and a peripheral dimension less than the peripheral dimension of the inner surface of said arcuate duct end portion, said frame member including:
a vertical wall and an angularly extending flange, said flange upper surface arranged to be positioned in abutting relation with said inner surface of said arcuate duct,
means to form at least one gap in said frame member between said free end portions and expose a portion of said circular duct edge portion when said arcuate duct end portion is positioned on said arcuate frame member flange portion, and
means to secure said frame flange to the end portion of said arcuate duct.

16. A method for connecting the end portions of a duct having a generally arcuate configuration comprising, positioning a pair of generally arcuate frame members each having a vertical wall portion and a horizontally extending flange portion on the end of a pair of arcuate ducts with the flange portions positioned on a surface of said arcuate ducts, each of said generally arcuate frame members having free end portions and a peripheral dimension less than the peripheral dimension of said arcuate duct members so that at least one gap is formed in each of said arcuate frame members, securing each of said frame member flange portions to said respective duct end portions with an edge portion of said duct end portion extending into said gap formed in said respective arcuate frame member, positioning said arcuate members so that said vertical wall portions face each other, positioning a seal member around said frame member and across said gaps formed in each of said arcuate frame member, and connecting said frame members to each other and sealing free end portions of said frame member and said portion of said duct end portions in said gap.

17. A duct joint frame as set forth in claim 1 in which,
a seal means to form a seal between said circular frame member free end portions.

18. A duct joint frame as set forth in claim 1 in which,
a seal means forms a seal between said exposed edge portion of said circular duct extending into said gap in said frame member and said circular frame member free end portions.

* * * * *